United States Patent [19]

Nass

[11] Patent Number: 5,010,846
[45] Date of Patent: Apr. 30, 1991

[54] LABORATORY ANIMAL FEEDER COVER

[76] Inventor: Thomas O. Nass, 14502 La Cuarta, Whittier, Calif. 90605

[21] Appl. No.: 432,527

[22] Filed: Nov. 6, 1989

[51] Int. Cl.⁵ .............................................. A01K 39/00
[52] U.S. Cl. ..................... 119/18; 119/52.1; 229/125.11; 220/334
[58] Field of Search ...................... 119/18, 51.01, 52.1; 220/334; 229/125.11

[56] References Cited

U.S. PATENT DOCUMENTS 1,508,878  9/1924  Evalenko .................. 229/125.11
3,185,133  5/1965  Bird .......................... 119/18

Primary Examiner—John Weiss
Attorney, Agent, or Firm—Stetina and Brunda

[57] ABSTRACT

An improved device for covering a laboratory animal feeder, specifically adapted for retrofitting to an existing laboratory animal feeder, which includes an inclined, flanged cover to decrease the likelihood of contaminants entering the feeder. The invention also includes an attachment means which allows animal food to be quickly and easily entered into a feeder without detaching the cover from the feeder.

12 Claims, 1 Drawing Sheet

U.S. Patent
Apr. 30, 1991
5,010,846
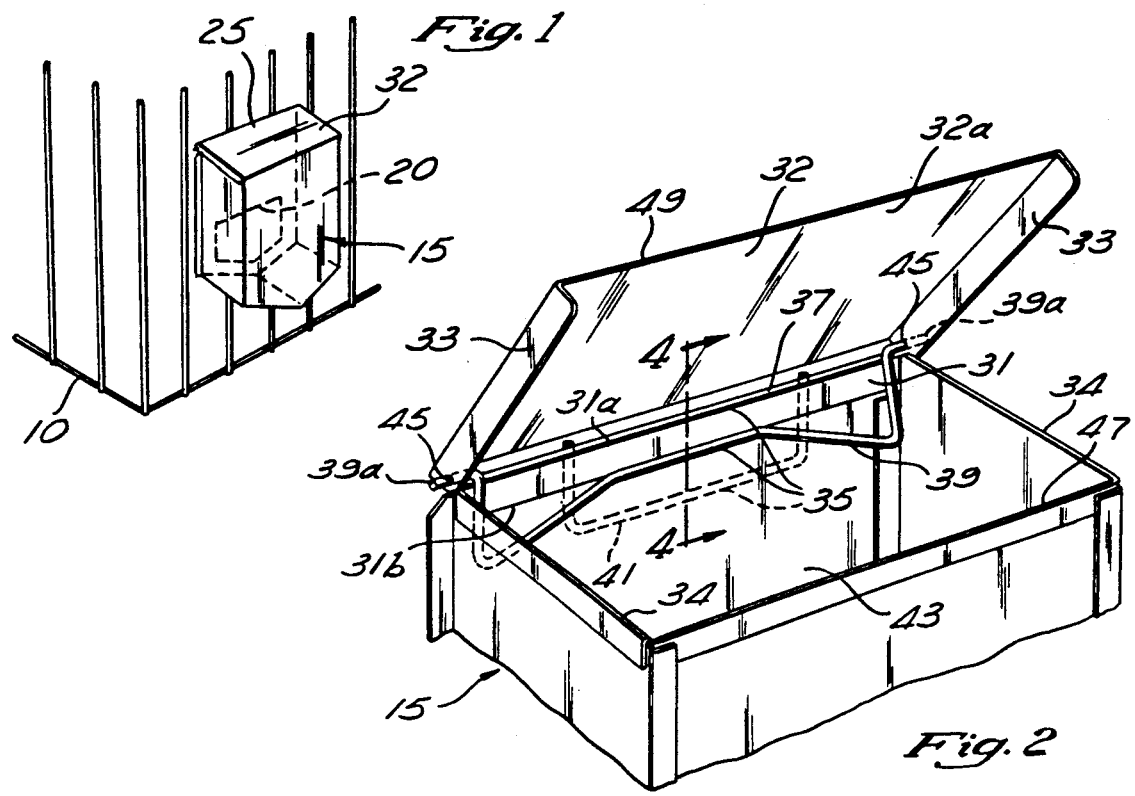
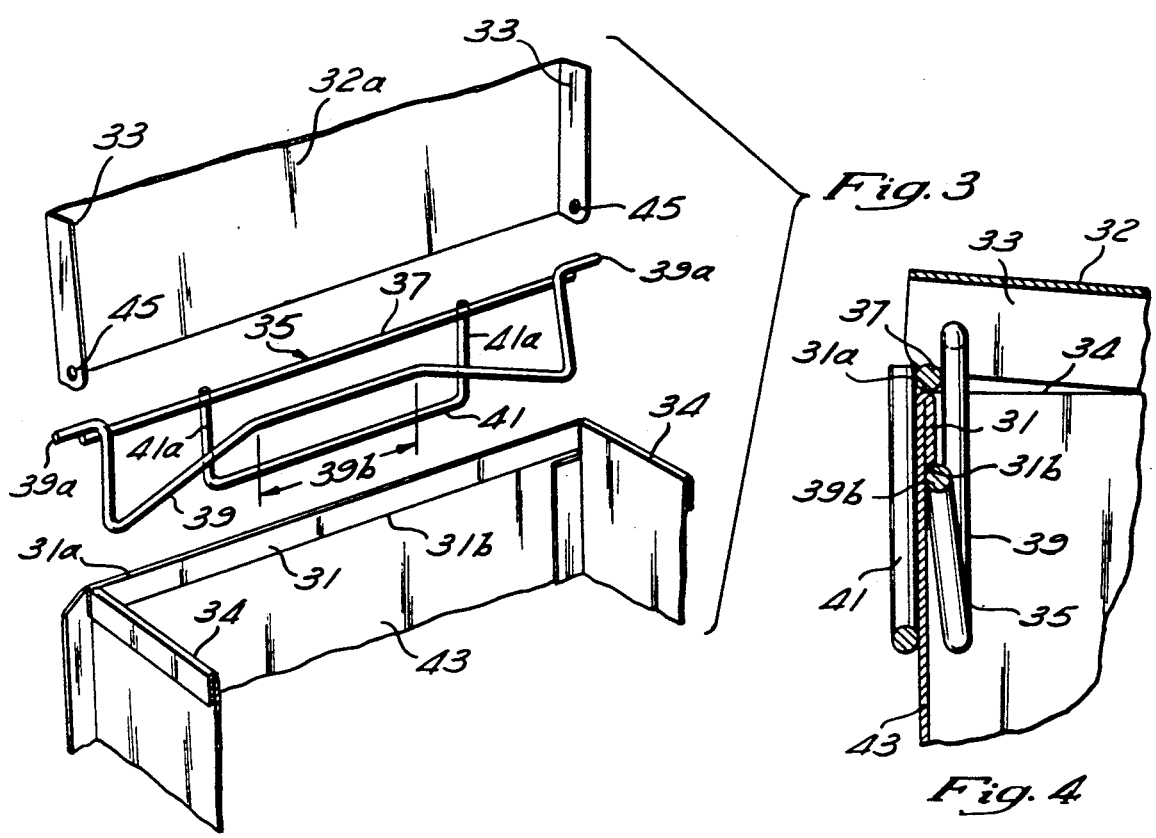

LABORATORY ANIMAL FEEDER COVER

BACKGROUND OF THE INVENTION

The present invention relates to devices used to feed laboratory animals and, more particularly, to a device for covering laboratory animal feeders to prevent contamination of laboratory animal food, and which can be opened without removal from the animal feeder. The present invention is specifically adapted for retrofitting to existing laboratory animal feeders.

It is typical in the storage of laboratory animals to utilize an animal feeder which is affixed to the side of a cage and has an opening so that the animal can receive food from inside the cage. Food is typically placed in the feeder through an opening formed in the top of the feeder. These units typically either have no top cover or have an integral, welded-on hinged top covering the top opening. In laboratory testing environments it becomes critical to make sure the food that is eaten by the laboratory animal does not become contaminated by urine, feces or other animal waste. Such contaminants introduced into the food of laboratory animals may adversely affect or even invalidate the results of experiments in which substances are tested by mixing them with the laboratory animal food. These experiments usually depend upon the purity and known content of food provided to the laboratory animal. In addition, even when test substances are not added to the food, contaminants may tend to adversely affect the lifespan and physical condition of the laboratory animals. This in turn becomes a problem when, as is usually the case, it is important to test laboratory animals which are in normal physical condition.

In large laboratory settings, where multiple cages are stacked one on top of another, there is the possibility for urine, feces, dust and other airborne contaminants to fall into the feeder and contaminate the food. In most instances, the top of feeder is open to receive contaminating debris from outside feeder.

Thus, there exists a substantial need in the art for an improved device for covering an animal feeder which can be retrofitted to conventional feeders and which prohibits contamination by urine and other animal wastes, etc.

SUMMARY OF THE INVENTION

The present invention specifically addresses and alleviates the introduction of contaminating waste, etc. into the feeder while allowing for the rapid filling of the food into the container by maintaining the cover in close proximity to the feeder.

The present invention is specifically adapted for retrofitting to existing laboratory animal feeders by utilizing an attachment means, consisting of a wire or spring clip in the preferred embodiment of the present invention, which serves to both attach the feeder cover of the present invention to the laboratory animal feeder and to dispose the feeder cover on an incline relative to the top of the feeder. With the top horizontal surface of the feeder cover so disposed at an incline, the present invention facilitates the rapid draining of urine and other animal wastes away from the top opening of the feeder. In addition, the side flanges on the feeder cover of the present invention extend over and below the top of the feeder side walls, thereby serving to prevent urine and other animal wastes from leaking over the sides of the feeder cover and into the feeder. Furthermore, the attachment means of the present invention forms a hinged connection between the feeder cover and the feeder, allowing food to be rapidly and conveniently entered into the top of the feeder simply by rotating the feeder cover upward as a hinged lid. Because the cover lid of the present invention opens as a hinged lid, food can be loaded into the feeder without detaching the cover from the feeder and risking the possibility of losing the feeder cover.

The attachment means or spring clip portion of the present invention forms a releasable connection between the laboratory animal feeder and the feeder cover of the present invention. This releasable connection allows the feeder cover of the present invention to be completely disattached from the feeder for cleaning or other purposes if desired.

DESCRIPTION OF THE DRAWINGS

These and other features of the present invention will become more apparent upon reference to the drawings, wherein:

FIG. 1 is a perspective view illustrating the manner in which a conventional laboratory animal feeder attached to the side of a laboratory animal cage is retrofitted with the feeder cover of the present invention.

FIG. 2 is an enlarged perspective view illustrating the manner in which the feeder cover is releasably attached to the feeder by the attachment means or spring clip of the present invention and showing the feeder cover of the present invention hinged opened to allow food to be entered into the top of the laboratory animal feeder.

FIG. 3 is an enlarged exploded view disclosing the detail construction of the feeder cover lid and attachment means or spring clip portions of the present invention, and also disclosing the upper part of the laboratory animal feeder to which the feeder cover assembly is attached.

FIG. 4 is an enlarged cross sectional view showing the manner in which the feeder cover lid is releasably attached by the attachment means or spring clip to the back wall of the laboratory animal feeder.

DETAILED DESCRIPTION OF THE PREFERRED EMBODIMENT

Referring initially to FIG. 1, there is shown a conventional laboratory animal feeder, designated generally by the numeral 15 which may be disposed upon the side of the conventional wire laboratory animal cage 10. For purposes of this description, the vertical side of the laboratory animal feeder which attaches to the bars of the animal cage is hereinafter referred to as the front feeder wall, while the vertical side of the feeder opposite to the front feeder wall is referred to as the back feeder wall. The two vertical sides of the feeder adjacent to and between the front and back walls are referred to as side walls. An opening 20 is formed in the laboratory animal feeder located on the front feeder wall allows the animal to obtain food from the feeder. Food is entered into the feeder through the upper portion of the feeder 25.

As depicted in FIGS. 1 and 2, the laboratory animal feeder is retrofitted with the present invention, i.e. the laboratory animal feeder cover 32. Referring to FIGS. 2 and 3, the preferred embodiment of the present invention comprises an attachment means or spring clip 35 and a cover member or lid 32 having a pair of side flanges 33 which are disposed at right angles to the major horizontal surface 32a of the cover member or lid and are sized to extend over and beyond the top edges 34 of the side walls of the feeder.

Referring particularly to FIG. 3, in the preferred embodiment, the attachment means or spring clip portion 35 of the present invention is comprised of a central torsion bar 37, a W-shaped internal clamping member 39 having a detent shoulder portion 39b and a U-shaped external clamping member 41. The two spindle ends, 39a of the internal clamping member are rigidly affixed to the corresponding ends of the central torsion bar 37 on that side of the torsion bar facing the inside of the feeder as shown in FIGS. 2 through 4. The vertical sides or legs 41a of the external clamping member 41 are disposed at right angles to the axis of the central torsion bar 37. The ends of these vertical sides or legs are rigidly affixed to the body of the central torsion bar on that side of the torsion bar facing the outside of the feeder as shown in FIGS. 2 through 4.

As shown in FIG. 2, the spindle arms 39A of the internal clamping member 39 engage matching holes 45 in the vertical side flanges 33 of the cover member or lid 32 creating a hinged connection between the feeder cover 32 and the attachment means or spring clip 35.

The attachment means or spring clip 35 of the present invention is used to detachably engage the cover member 32 of the present invention with the laboratory animal feeder. When the cover member and the attachment means or spring clip are in place on the feeder, as shown in FIGS. 2 and 4, the attachment means or spring clip releasably engages the back wall 43 of the feeder and thereby attaches the present invention to the feeder.

Referring to FIGS. 2, 3 and 4, it may be seen that the conventional laboratory animal feeder is formed having a turned-over edge or flange 31 which forms a shoulder 31a along the upper lip of the back feeder wall 43 of the laboratory animal feeder. It will be noted that this turned-over flange feature presently exists on laboratory animal feeders. Therefore, existing laboratory animal feeders need not be modified to accomodate the present invention. Referring specifically to FIGS. 2 and 4, in attaching the cover member 32 to the laboratory animal feeder, the bottom of the attachment means or spring clip 35 is pushed downward over the top of the shoulder 31a of the turned-over flange 31 on the feeder with the shoulder 31a of the turned-over flange 31 wedging between the internal clamping member 39 and the external clamping member 41. The thickness of the shoulder 31a creates a wedging action between the internal clamping member and the external clamping member which acts to separate these members by rotating them apart on an axis located at the center and along the length of the central torsion bar 37. In separating, the internal and external clamping members act through the rigid affixations to the central torsion bar to rotate the central torsion bar on its axis in opposite directions, giving rise to an opposing torque in the central torsion bar which is transmitted in equal and opposite directions to the internal and external clamping members. Because these equal and opposite torques act to resist the separation of the internal and external clamping members, they give rise to a biasing means or clasping force by the clamping members on the turned-over flange and feeder wall.

As shown in FIG. 4, the distance in elevation between the central torsion bar 37 and the detent-shoulder section 39b of the internal clamping member 39 is such that when the attachment means or spring clip 35 engages the back feeder wall 43 of the laboratory animal feeder, the bottom of the central torsion bar 37 seats firmly against the shoulder 31a of the turned-over flange 31 and the top of the detent-shoulder portion 39b of the internal clamping member seats firmly against the bottom 31b of the turned-over flange 31. Thus, to attach the feeder cover of the present invention to the laboratory animal feeder, the attachment means or spring clip is moved downward over the back feeder wall with the turned-over flange wedging between the internal and external clamping members until the top of the detent shoulder portion 39b of the internal clamping member seats underneath and against the bottom 31b of the turned-over flange, and the bottom of the central torsion bar seats against the top 31a of the turned-over flange. Once the attachment means or spring clip has been pushed fully downward (i.e. until the top of the detent-shoulder 39b of the internal clamping member is below the bottom 31b of the turned-over flange), the biasing means or clasping force of the attachment means or spring clip acts to press the internal clamping member against the back feeder wall and thereby hold the top of the detent-shoulder portion of the internal clamping member seated underneath and against the bottom 31b of the turned-over flange. By seating in this manner, the detent-shoulder portion of the internal clamping member creates a releasable snap-lock engagement between the attachment means or spring clip and the back feeder wall. This releasable snap-lock engagement acts to resist the upward movement of the attachment means and feeder cover assembly once in place on the present invention, and thereby serves to prevent the feeder cover from being accidentally disattached from the animal feeder. In addition, as noted above, with the attachment means or spring clip in the seated position, the bottom of the central torsion bar is seated against the top 31a of the turned-over flange. This abutment prevents the feeder cover assembly from sliding downward too far below the seated position.

With the attachment means or spring clip 35 of the feeder cover seated and in place, the cover can be opened to load animal food into the feeder by grasping the front edge 49 of the feeder cover and pulling it upward to a position such as shown in FIG. 2. The feeder cover 32 opens as a lid hinged on the spindle ends 39a of the internal clamping member 39 with the hinge axis located at the back of the feeder at a position parallel and at an elevation slightly higher than the shoulder 31a of the turned-over flange 31.

When the feeder cover 32 is attached to the laboratory animal feeder and closed against the top of the feeder, the front edge 49 of the cover member 32 rests against the top edge 47 of the front feeder wall. Because the front edge of the cover lid rests on top of the top edge of the front feeder wall, and because the back portion of the cover lid rests on the spindle ends 39a of the internal clamping member which are slightly higher in elevation than the top edge of the front feeder wall, the feeder cover inclines downwardly in elevation from the front wall to the back wall of the laboratory animal feeder. In this arrangement any urine or animal waste falling over the top of the animal feeder is directed away from the inside of the feeder by sliding off the incline of the cover member of the feeder cover, and thereby preventing such contaminants from forming puddles on top of the feeder cover which otherwise tend to spill over and around the underside of the cover lid and into the feeder. In addition, with the feeder cover 32 closed, the vertical side flanges 33 of the feeder cover extend over the outside of the top edges 34 of the side walls 34 of the laboratory animal feeder. These side flanges 33 of the feeder cover eliminate the possibility of contaminants entering the feeder between the feeder cover and the upper edges 34 of the feeder side walls.

To detach the present invention from the laboratory animal feeder for cleaning or other purposes, the cover member 32 is simply grasped and pulled upwardly and away from the laboratory animal feeder pulling the attachment means or spring clip 35 upward, with sufficient force to cause the releasable snap lock engagement between the detent-shoulder section of the internal clamping member and the bottom edge of the turned-over flange to release, and continuing to slide the attachment means or spring clip upward until the present invention is completely detached from the feeder.

It will become apparent to those skilled in the art that various changes in size, shape, number and arrangment of parts described hereinbefore may be made without departing from the spirit of this invention.

What is claimed is:

1. An apparatus comprising:
   a laboratory animal feeder having an upper open end and a plurality of walls, at least one of said walls having a flange formed thereon;
   a generally planar member sized to extend over the upper open end of said laboratory animal feeder;
   a spring clip pivotally mounted to said planar member and engageable with one wall of said laboratory animal feeder to pivotally mount said planar member to said laboratory animal feeder, said spring clip being formed from a juxtaposed first and second wire member, said first member sized to extend downwardly upon one side of said one wall of said laboratory animal feeder and said second member sized to extend downwardly upon the opposite side of said one wall of said laboratory animal feeder; and
   a shoulder portion formed upon said second member of said spring clip, said shoulder portion positioned to abut an edge portion of the flange formed on said one wall of said laboratory animal feeder.

2. The cover of claim 1 wherein said second member of said spring clip includes a pair of axles at opposite ends thereof which are insertable within apertures formed on said planar member.

3. The cover of claim 2 wherein said shoulder portion is formed in the central region of said second member of said spring clip.

4. The cover of claim 3 wherein said planar member includes a pair of side flanges sized to extend over opposite sides of said laboratory animal feeder.

5. The cover of claim 4 wherein said apertures are formed in said pair of side flanges.

6. The cover of claim 5 wherein said pair of axles and said apertures are positioned to dispose said planar member at an angular inclination relative said open end of said laboratory animal feeder.

7. A cover for a laboratory animal feeder, the laboratory animal feeder having an upper open end and a plurality of walls, at least one of said walls having a flange formed thereon, the cover comprising:
   a generally planar member sized to extend over the upper open end of a laboratory animal feeder;
   a spring clip pivotally mounted to said planar member and engageable with one wall of said laboratory animal feeder to pivotally mount said planar member to said laboratory animal feeder, said spring clip being formed from a juxtaposed first and second wire member, said first member sized to extend downwardly upon one side of said one wall of said laboratory animal feeder and said second member sized to extend downwardly upon the opposite side of said one wall of said laboratory animal feeder; and
   a shoulder portion formed upon said second member of said spring clip, said shoulder portion adapted to be positioned to abut an edge portion of the flange formed on said one wall of said laboratory animal feeder.

8. The cover of claim 7 wherein said second member of said spring clip includes a pair of axles at opposite ends thereof which are insertable within apertures formed on said planar member.

9. The cover of claim 8 wherein said shoulder portion is formed in the central region of said second member of said spring clip.

10. The cover of claim 9 wherein said planar member includes a pair of side flanges sized to extend over opposite sides of said laboratory animal feeder.

11. The cover of claim 10 wherein said apertures are formed in said pair of side flanges.

12. The cover of claim 11 wherein said pair of axles and said apertures are positioned to dispose said planar member at an angular inclination relative said open end of said laboratory animal feeder.

* * * * *